Figure 1:
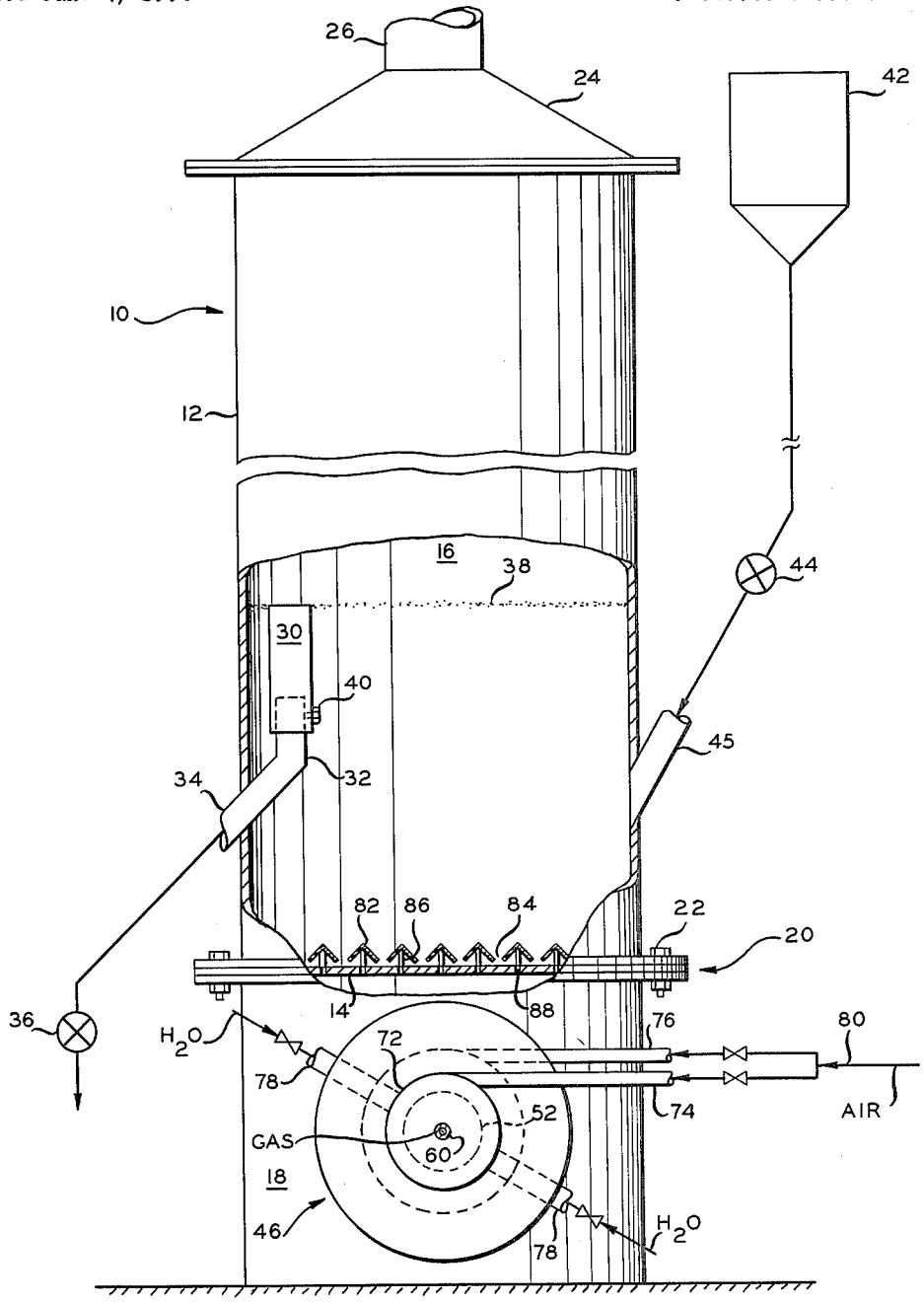

INVENTOR.
R. E. DOLLINGER
BY Young & Quigg
ATTORNEYS

United States Patent Office 3,256,612
Patented June 21, 1966

3,256,612
PROCESS AND APPARATUS FOR FLUIDIZED BED GAS-SOLIDS CONTACTING
Robert E. Dollinger, Bartlesville, Okla., assignor to Phillips Petroleum Company, a corporation of Delaware
Filed Jan. 2, 1964, Ser. No. 335,287
11 Claims. (Cl. 34—10)

This invention relates to a process and apparatus for gas-solids contacting. A specific aspect of the invention is concerned with the drying and treating of carbon black pellets in a fluidized bed.

Various types of particulate solids may be dried and/or treated in a fluidized bed with a suitable drying and/or treating gas. Pelleted carbon black has been both dried and treated in this manner. A suitable drying gas has been prepared by burning fuel with air. Hot air has also been used as a treating gas for partially oxidizing pelleted carbon black. One of the problems in fluidized bed drying and/or treatment of carbon black is the danger of overtreating portions of the treated carbon black because of dead spots in the fluidized bed. Instances have occurred in the oxidative treatment of carbon black-pellets, or in the drying of same with drying gas containing substantial quantities of oxygen in which the carbon black pellets in the dead spots in the bed were overheated and the bed was ignited so as to produce rapid combustion.

The present invention provides a process and apparatus which prevents dead spots in a fluidized bed and which provides for adequate temperature control of a fluidizing and treating gas used in maintaining a fluidized bed of solid particulate material.

Accordingly, it is an object of the invention to provide an improved process and apparatus for treating and/or drying particulate solids in a fluidized bed. Another object is to provide a process and apparatus for generating a fluidizing and treating gas at controlled temperatures. A further object is to provide an improved gas distributor for uniformly distributing a fluidizing and treating gas in a fluidized bed treater. Other objects of the invention will become apparent upon consideration of the accompanying disclosure.

A broad aspect of the invention comprises maintaining a fluidized bed of the particulate material to be treated by uniformly distributing a selected fluidizing and treating gas over the bottom of the fluidized bed so as to maintain the entire bed in boiling condition, feeding material into the bed below the top level, and withdrawing treated material from the top level of the bed. Uniform distribution is effected by an arrangement of distribution elements in the form of inverted angle irons or troughs which are arranged with their apexes in a horizontal plane and in parallel rows with their skirts uniformly and closely spaced apart to provide narrow elongated slits for distribution of the gas into the bed. The slope of the sides of the trough is greater than the angle of repose of the material being treated. In one embodiment of the invention, the level of withdrawal of the particulate material from the bed is controlled so as to determine the depth of the bed. This is accomplished by apparatus including a telescoping outlet conduit which is adjustable vertically to change the level of withdrawal.

Another embodiment of the invention provides an improved gas generator having structure for tangential introduction of air to the combustion chamber to effect spiraling and efficient mixing of the fuel gas and air and also tangential introduction of secondary air and steam on water for tempering the hot combustion gas. The primary combustion section of the combustion chamber is of lesser diameter than the secondary combustion section thereof.

Figure 2:
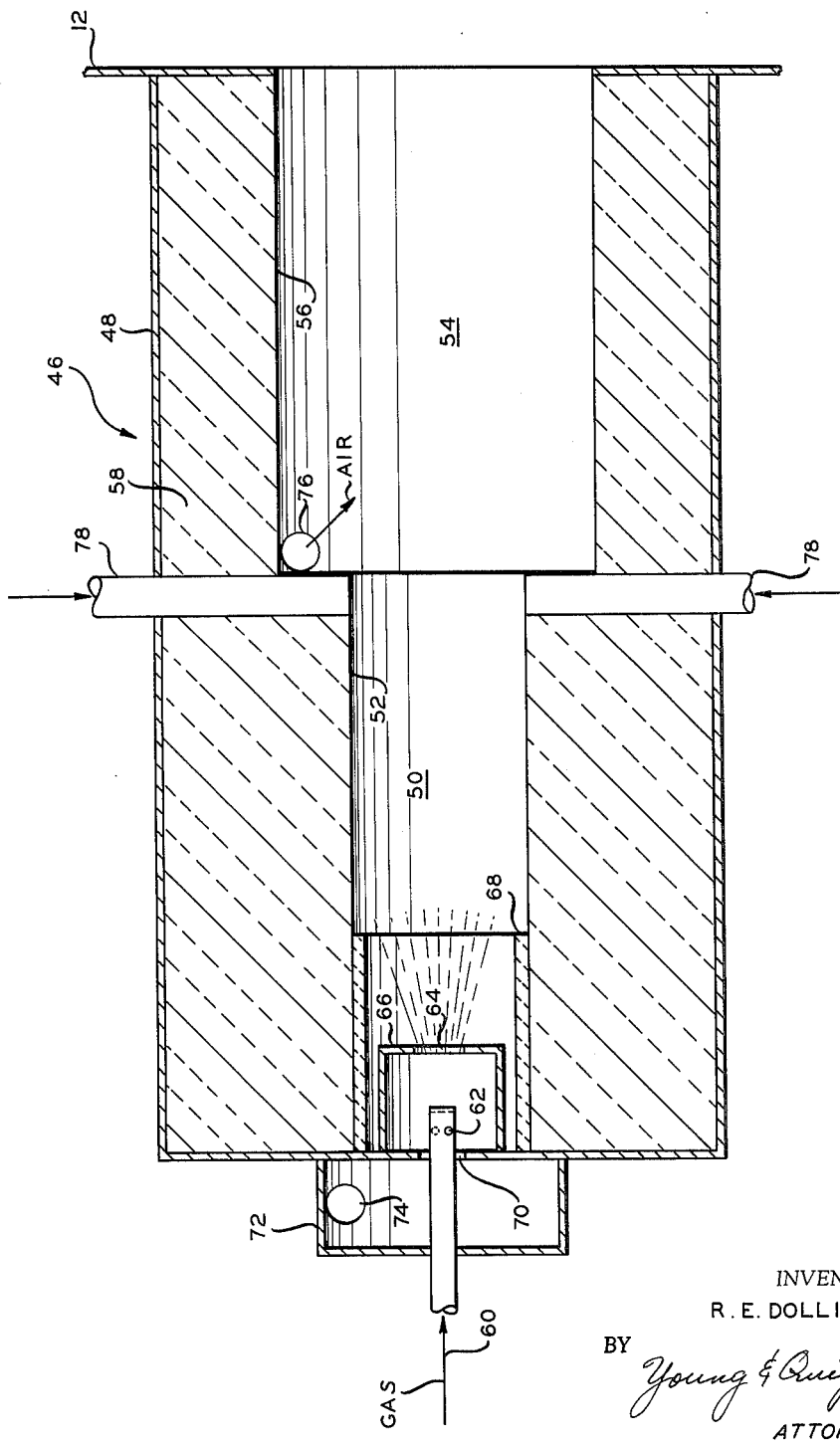
Figure 3:
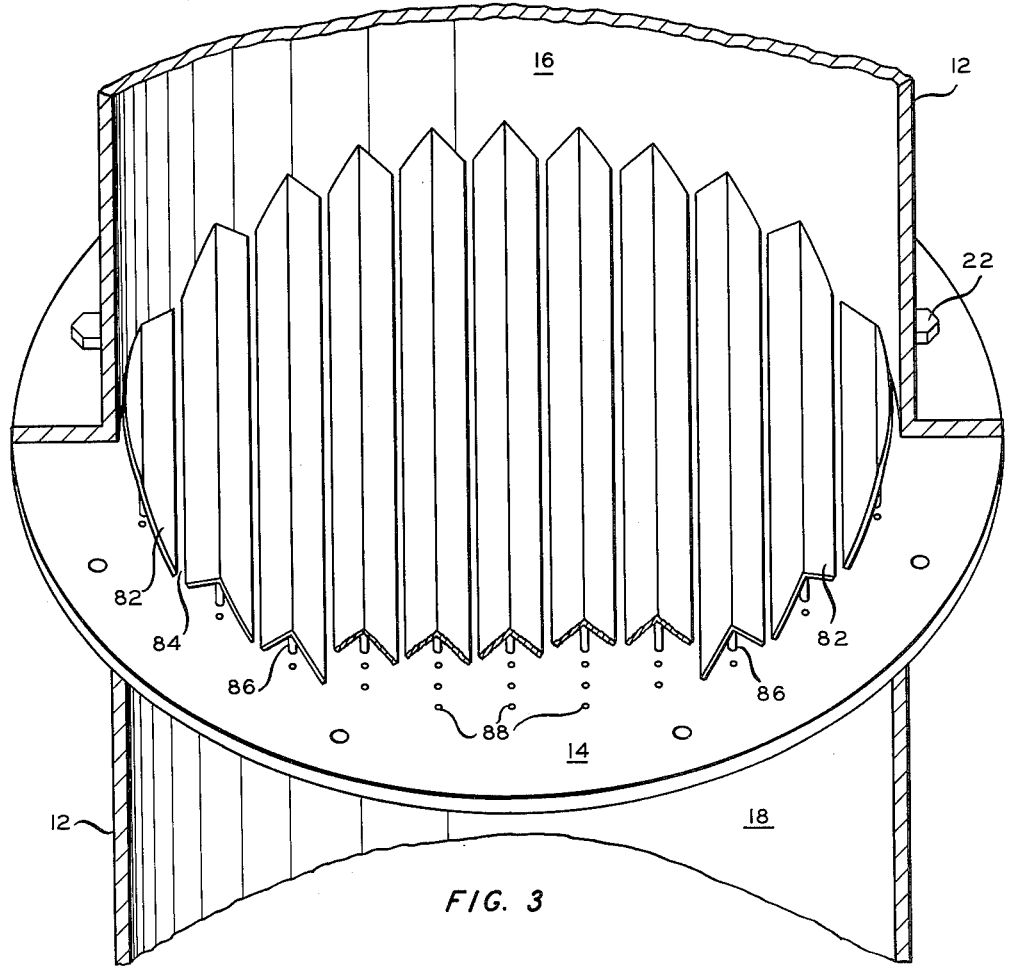
Figure 4:
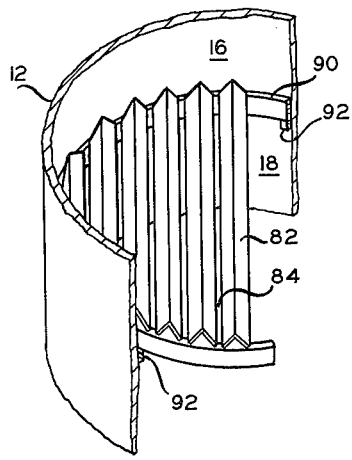

A more complete understanding of the invention may be had by reference to the schematic drawing of which FIGURE 1 is an elevation of a preferred embodiment of the invention; FIGURE 2 is a longitudinal cross section of a preferred embodiment of the gas generator of FIGURE 1; FIGURE 3 is a pictorial view of a preferred arrangement of the gas distributing means illustrated in FIGURE 1; and FIGURE 4 is a pictorial view of a modified gas distributor.

Referring to FIGURE 1, a gas-solids treater 10 comprises an upright shell or housing 12 divided into upper and lower sections by a gas distributor plate 14. The upper section encloses gas-solids treating chamber 16 and the lower section encloses gas injection chamber 18. The upper and lower sections of shell 12 are attached by flanged joints 20 by means of bolts 22. Other means of attaching the shell sections may be utilized and it is also feasible to fabricate the shell in one continuous cylindrical member and support gas distributor plate 14 on brackets welded to the inside of the shell. In the embodiment shown in FIGURE 1, plate 14 is of sufficient diameter to extend between the flanges of the joint 20 and is provided with holes through which bolts 22 extend. The upper end of the shell is closed by dome 24 to which stack 26 is attached. Outlet means for solids from upper chamber 16 comprises an upright conduit 30 which telescopes with an upright section 32 on a downwardly oblique conduit 34 in which is positioned a star valve or other solids feeder 36. Conduit 30 can be raised or lowered over section 32 so as to control the bed height or level of the top of the fluidized bed 38 within chamber 16. Any suitable telescoping and adjustable arrangement of conduits 30 and 32 is feasible. One arrangement comprises a reasonable close fit between conduits 30 and 32 with a set screw 40 extending through conduit 30 and engaging conduit 32. A slidable ring on conduit 32 with means for clamping same to the conduit is another method of providing an adjustment of the height of the upper end of conduit 30.

A solids inlet conduit 45 connects obliquely with shell 12 in the upper chamber at a level below bed level 38. Conduit 45 connects with a feed hopper 42 and is provided with a flow control device such as star valve 44.

Hot gas for fluidizing the solids in chamber 16 is provided by a gas generator furnace or burner 46 which is shown in more detail in FIGURE 2. Gas generator 46 comprises a cylindrical shell 48 which connects the one end directly with the lower section of shell 12 so that the generator feeds hot gas into chamber 18. Axially positioned within shell 48 is a combustion chamber comprising a primary combustion chamber 50 formed by conduit 52 and a secondary combustion chamber 54 formed within a larger conduit 56. This structure provides an annulus 58 between outer shell 48 and conduits 52 and 56 which is filled with a suitable insulating material. A fuel line 60 is coaxially positioned with conduit 52 and primary combustion chamber 50 so as to extend into same a short distance. Radial ports 62 near the end of fuel line 60 provide impingement of fuel gas on burner element 66 and thus assist in mixing the gas around the end of the fuel line and through the axial opening 64 in the inner end of burner element 66. A refractory cylindrical element 68 is provided in the inlet end of chamber 50 and is of sufficient internal diameter to act as a flame holder. An annular air inlet member 72 is coaxial with fuel gas line 60 and is provided with a tangential air inlet 74 which provides spiraling air passing through burner element 66 into combustion chamber 50. The tangential arrangement of air inlet 74 and radial ports 62 in lines 60 should be corresponding to provide efficient and complete combustion of the air and fuel gas in primary combustion chamber 50. In one embodiment of the gas generator conduits 52 and 56 are the inner surfaces of high temperature refractory material which serve as insulation for the hot gases formed in the generator.

A second tangential air inlet 76 is positioned adjacent the confluence of primary combustion chamber 50 and secondary combustion chamber 54 to provide secondary air to complete the combustion of the fuel within chamber 54 and to provide a tempering stream as needed. Inlet 76 is tangentially positioned in the same manner as inlet 74. Radial steam or water inlets 78 extend preferably to the juncture of conduit 52 with conduit 56 or other confluence of the two combustion chambers. The introduction of water or vapor in liquid form is used to control the temperature of the generated gas at any suitable level by controlling the amount of water introduced. Air injection conduits 74 and 76 may be supplied from a common air line 80 as shown in FIGURE 1.

The detail of gas distributor plate 14 is shown more clearly in FIGURE 3 wherein a series of horizontal inverted troughs or angular elements 82 are held in parallel arrangement and spaced apart just above plate 14 so that the skirts thereof provide narrow slits 84 for passage of gas and dispersion thereof upwardly into chamber 16. Troughs 82 are fabricated from high temperature alloy such as nickle chrome steel in the form of angle irons providing a slope greater than the angle of respose of the solid material being treated so that no build up of solids on the distributors is permitted. These troughs are supported in any suitable manner such as by upright rods 86. The apexes of the troughs are parallel and lie in a plane parallel to plate 14. Holes 88 are uniformly spaced under each trough along a line directly under the apex thereof. In this manner the plate 14 is uniformly perforated over the entire extent thereof within the shell 12. The ends of troughs 82 extend to the inner wall of shell 12 and provide a machined or close fit therewith so that no more gas will pass through the machined annulus than will pass through parallel slits 84.

The arrangement of the troughs should be such as to provide a slit area in the range of about 2 to about 5 percent of the area of the cross horizontal cross section of chamber 16 in order to provide more efficient gas distribution. Obviously, the hole area should be at least equal to and preferably greater than the slit area. It should be apparent that the troughs may be suspended or supported above the plate 14 by other means than rods 86. These rods may be positioned in opposing pairs near the edges of the skirts without obstructing flow through the slits. It is also feasible to form a welded unit of the troughs and support the welded unit on brackets inside shell 12 without the use of plate 14. No great amount of supporting strength is required by the trough structure, particularly, when the device is applied to the treatment of carbon black which has low density.

FIGURE 4 illustrates an embodiment of the gas distributor which omits the perforate plate and shows angle irons or troughs 82 welded together at spaced points to form a unitary structure and attached to support ring 90. The distributor fabricated in this manner may be supported in any suitable manner in shell 12 as by brackets 92 attached to the inner wall of shell 12 as by welding or riveting.

An apparatus substantially corresponding to the structure shown in the drawing was made and tested in the drying of carbon black pellets. Shell 12 had an inner diameter of 3' and was 10' high above plate 14. The upper end of conduit 30 was positioned 18½" above the apexes of troughs 82 and was fabricated of 3¼" conduit forming a slip joint with the 3" conduit 32. Feed conduit 40 was 4" conduit.

The distributor plate comprised a ⅝" thick type 316 stainless steel plate with perforations over the entire area of the plate within shell 12. These perforations were ⅛" holes on the center lines of the troughs or angle irons and were spaced ½" apart. The angle irons were ¾ x ¾", having 90° angles and were made of the same type of stainless steel as the plate, being supported therefrom by ¼" diameter stainless steel rods on spacing such that the skirts of the angle irons provided $\frac{1}{32}$" slits for gas passages. The rods were of such length as to hold the skirts off the plate ⅛".

Data from 4 runs made in this apparatus are presented in the table below:

| Run Number | 1 | 2 | 3 | 4 |
|---|---|---|---|---|
| Feed: | | | | |
| Wet Rate, lb./hr | 630 | 630 | 1,065 | 1,140 |
| Dry Rate, lb./hr | 346 | 341 | 572 | 627 |
| Moisture, wt. percent | 45 | 45.9 | 46.3 | 45 |
| Product: | | | | |
| Dry Rate, lb./hr | 240 | 329 | 555 | 552 |
| Moisture, wt. percent | 0.2 | 0.3 | 0.3 | 0.2 |
| Fines: | | | | |
| Cyclone, lb./hr | 100 | 21 | 20 | 70 |
| Loss to Burner, lb./hr | 6 | −9 | −3 | 5 |
| Wt. percent (Cyclone÷Product) | 29.4 | 6.0 | 3.5 | 11.25 |
| Wt. percent (Total÷Product) | 30.6 | | | 11.95 |
| Inlet Gas Conditions: | | | | |
| Air to Burner, s.c.f.h | 15,600 | 17,750 | 17,450 | 15,600 |
| Gas to Burner, s.c.f.h | 2,020 | 1,195 | 1,405 | 2,020 |
| $H_2O$ to Quench g.p.h | 94.2 | 68 | 65 | 77.25 |
| $H_2O$ to Quench, s.c.f.h | 16,500 | 11,750 | 11,380 | 13,540 |
| Inlet Gas After Combustion: | | | | |
| Total Rate, s.c.f.h | 34,900 | 30,790 | 30,270 | 31,850 |
| Temperature, °F | 810 | 778 | 1,110 | 1,149 |
| Composition, Mol. percent: | | | | |
| Nitrogen | 35.8 | 46.0 | 46.0 | 39.3 |
| Oxygen | 0.2 | 5.5 | 2.7 | 0.1 |
| Hydrogen | 2.3 | | | 2.4 |
| Carbon Dioxide | 4.7 | 3.5 | 5.0 | 5.3 |
| Carbon Monoxide | 1.3 | 0.2 | | 1.1 |
| Methane | | 0.4 | | |
| Water | 55.7 | 44.5 | 46.3 | 51.8 |
| Bed Conditions: | | | | |
| Expanded Ht., inches | 18.5 | 18.5 | 18.5 | 18.5 |
| Settled Ht., inches | 9.3 | 12.1 | 11.7 | 12.9 |
| Aug. Temp. °F | 352 | 247 | 263 | 336 |
| ΔP across Bed, inches $H_2O$ | 3.6 | 4.5 | 4.5 | 4.8 |
| Inlet Gas Velocity, ft./min. [a] | 128.5 | 98.5 | 99.4 | 117.2 |
| Outlet Gas Velocity, ft./min. [b] | 150.5 | 118 | 133.5 | 157.4 |
| Residence Time, min. [c] | 22.9 | 41.2 | 17.2 | 16.9 |
| Heat Balance: | | | | |
| Lost by Inlet Gas, B.t.u./hr | 340,722 | 341,150 | 556,090 | 564,800 |
| To Vaporize $H_2O$, B.t.u./hr | 310,000 | 310,000 | 522,000 | 557,000 |
| To Heat Black, B.t.u./hr | 21,000 | 12,500 | 20,750 | 34,200 |
| Efficiency, percent | 97.3 | 94.6 | 97.7 | 104.8 |

[a] Based on indicated gas rate and bed temperature and empty drier transverse area.
[b] Same as (a), except water vapor removed from wet black added to the gas rate.
[c] Based on a density of black in lb./ft.³.

The gas distribution provided by the slotted plate of the invention was particularly good, there being no burning of black in Run No. 2 in which the oxygen concentration was 5.5. This is also evidenced by the efficiency of 94.6 obtained in this run. The run data also show the versatility of the burner in controlling the gas inlet temperature to the fluidized bed over a wide range by controlling the amount of quench and the proportions of fuel gas and air fed to the burner. Effective drying with large quantities of moisture in the fluidizing gas was feasible as shown by the water concentration in the fluidizing gas which ranges from 44.5 to 55.7 mol percent.

Certain modifications of the invention will become apparent to those skilled in the art and the illustrative details disclosed are not to be construed as imposing unnecessary limitations on the invention.

I claim:
1. Apparatus for dispersing upwardly flowing gas into a fluidized bed of particulate solids which comprises:
    (1) a circular plate;
    (2) a series of inverted parallel trough elements supported above said plate in spaced-apart relation thereto with their apexes in a plane parallel to said plate, their skirts being closely spaced apart for passage of gas therebetween, said elements forming a circular pattern concentric with said plate;
    (3) upright rods on the plate of (1) supporting the trough elements of (2); and

(4) a row of uniformly and closely spaced-apart holes in said plate under each trough element of (2) for passage of upwardly flowing gas thru said plate.

2. The plate of claim 1 including an annular unobstructed section outside of the circular pattern of trough elements having bolt holes therethru for attaching to flanges of a fluidized bed heat exchange unit.

3. Apparatus for gas-solids contacting comprising in combination:
   (1) an upright cylindrical shell having top and bottom closures and divided into an upper gas-solids contacting chamber and a lower gas chamber by a horizontal gas distribution plate;
   (2) gas outlet means in the top closure of (1);
   (3) gas inlet means in the lower gas chamber of (1) in communication with a source of treating gas;
   (4) solids inlet means in the upper chamber of (1); and
   (5) solids outlet means in the lower section of the upper chamber of (1) comprising:
      (a) an upright conduit within said upper chamber;
      (b) a withdrawal conduit having an upright section on the upper end in telescoping arrangement with the upright conduit of (a) and an oblique section passing downwardly thru the shell of (1) above said plate, the upright conduit of (a) being adjustable vertically to control the bed height of solids in the upper chamber of (1); and
      (c) flow control means in the oblique sction of (b).

4. The apparatus of claim 3 wherein the gas distribution plate of (1) has the structure of claim 2.

5. The apparatus of claim 3 wherein the shell of (1) has an upper section and a lower section attached by flanges with bolts extending thru holes in said flanges; and the distribution plate of (1) has the structure of claim 3, said annular section extending between said flanges and said bolts passing thru the holes therein.

6. The apparatus of claim 3 wherein the gas inlet of (3) is connected with the outlet of a gas generator comprising:
   (a) a housing having an axial combustion chamber therein forming an annulus with said housing for insulation;
   (b) a fuel gas feed line extending axially into said combustion chamber;
   (c) an annular air chamber surrounding a section of said fuel line near the delivery end thereof having a tangential air inlet;
   (d) a cylindrical chamber surrounding said end and extending into said combustion chamber, said cylinder chamber having an axial opening for fuel gas from said fuel line and forming an annular air inlet with said fuel line leading from said air chamber to said combustion chamber;
   (e) a second tangential air inlet leading to said combustion chamber substantially downstream of the cylindrical chamber of (d); and
   (f) means for injecting water into said combustion chamber adjacent the air inlet of (e).

7. A gas generator for generating a treating gas for a fluidized bed gas-solids treater comprising:
   (1) a housing having an axial combustion chamber therein forming an annulus with said housing for insulation;
   (2) a fuel gas feed line extending axially into said combustion chamber;
   (3) an annular air chamber surrounding a section of said fuel line near the delivery end thereof having a tangential air inlet;
   (4) a cylindrical chamber surrounding said end and extending into said combustion chamber, said cylinder chamber having an axial opening for fuel gas from said fuel line and forming an annular air inlet with said fuel line leading from said air chamber to said combustion chamber;
   (5) a second tangential air inlet leading to said combustion chamber substantially downstream of the cylindrical chamber of (d); and
   (6) means for injecting water into said combustion chamber adjacent the air inlet of (e).

8. The generator of claim 7 wherein the downstream section of said combustion chamber is substantially larger in diameter than the upstream section, said sections being contiguous and the second air inlet of (5) and the water injection means of (6) terminating adjacent the juncture of said sections.

9. A gas distributor for use in a fluidized bed gas-solids contactor comprising a series of inverted parallel trough elements having their apexes in a common plane and their skirts uniformly and closely spaced apart to form narrow slits for gas passages, each said element being rigidly attached to each adjacent element to form a rigid unit having a periphery of regular configuration and the area of said slits being in the range of about 2 to 5 percent of the area of said configuration.

10. The apparatus of claim 4 wherein the gas distribution plate of (1) has the structure of claim 9.

11. A process for drying wet carbon black pellets which comprises the steps of:
   (1) maintaining said pellets in a fluidized bed with a drying gas;
   (2) preparing the drying gas of (1) by burning a fuel gas in admixture with a tangentially moving stream of air to produce a hot combustion gas at a temperature above about 2000° F.;
   (3) tempering said gas by admixing up to 40 weight percent water vapor therewith to reduce the temperature of the gas of step (2) to below about 1400° F.;
   (4) passing the gas resulting from step (3) upwardly into said bed thru a series of elongated narrow passageways uniformly distributed over the bottom of said bed;
   (5) withdrawing dried pellets from said bed at a predetermined level to control the bed height; and
   (6) adding wet pellets to a lower section of said bed.

References Cited by the Examiner
UNITED STATES PATENTS

| | | | |
|---|---|---|---|
| 2,443,259 | 6/1948 | Martin | 263—19 |
| 2,666,269 | 1/1954 | Parry | 263—21 |
| 3,016,624 | 1/1962 | Bliss | 34—57 |
| 3,040,439 | 6/1962 | Frost | 34—57 |
| 3,079,222 | 2/1963 | Reeve | 34—57 |
| 3,192,644 | 7/1965 | Knibbs et al. | 34—57 |

WILLIAM F. O'DEA, *Primary Examiner.*

JOHN J. CAMBY, *Assistant Examiner.*

UNITED STATES PATENT OFFICE
CERTIFICATE OF CORRECTION

Patent No. 3,256,612                            June 21, 1966

Robert E. Dollinger

It is hereby certified that error appears in the above numbered patent requiring correction and that the said Letters Patent should read as corrected below.

Column 5, line 32, for the claim reference numeral "2" read -- 1 --; line 36, for the claim reference numeral "3" read -- 2 --; column 6, line 32, for the claim reference numeral "4" read -- 3 --.

Signed and sealed this 22nd day of August 1967.

(SEAL)
Attest:

ERNEST W. SWIDER                                EDWARD J. BRENNER
Attesting Officer                                       Commissioner of Patents